United States Patent [19]

Fitch et al.

[11] Patent Number: 4,602,508
[45] Date of Patent: Jul. 29, 1986

[54] CONTINUOUS GRAVITY GRADIENT LOGGING

[75] Inventors: John L. Fitch, Dallas; W. D. Lyle, Jr., Grapevine, both of Tex.

[73] Assignee: Mobil Oil Corporation, New York, N.Y.

[21] Appl. No.: 657,657

[22] Filed: Oct. 4, 1984

[51] Int. Cl.⁴ .............................................. G01V 7/00
[52] U.S. Cl. ................................................ 73/382 G
[58] Field of Search ......................... 73/382 G, 382 R

[56] References Cited

U.S. PATENT DOCUMENTS 4,399,693 8/1983 Gournay ................................ 73/152
4,419,891 12/1983 Browning ......................... 73/382 G
4,475,386 10/1984 Fitch et al. ............................ 73/152

OTHER PUBLICATIONS

*The Art of Electronics*, P. Horowitz et al., Cambridge University Press, pp. 621–623.

*Primary Examiner*—Jerry W. Myracle
*Assistant Examiner*—John E. Chapman, Jr.
*Attorney, Agent, or Firm*—A. J. McKillop; Michael G. Gilman; George W. Hager, Jr.

[57] ABSTRACT

A continuous gravimetry survey is carried out with a gravity logging tool having a column of fluid within the tool. First and second pressure sensors are located at spaced-apart axial positions within an upper portion of the fluid column. Third and fourth pressure sensors are located at spaced-apart axial positions within a lower portion of the fluid column. The outputs from the first and second pressure sensors are differenced to produce a first pressure difference signal. The outputs of the third and fourth pressure sensors are also differenced to produce a second pressure difference signal. The difference between these first and second pressure difference signals is related to the gravity gradient along the earth formation adjacent the fluid column. Such a gravity gradient is a continuously moving gradient that is insensitive to acceleration effects from unsteady motions of the logging tool as it traverses the earth formation during the gravimetry survey.

28 Claims, 4 Drawing Figures

CONTINUOUS GRAVITY GRADIENT LOGGING

BACKGROUND OF THE INVENTION

The present invention relates to a method and system for the continuous logging of the gravity gradient along an earth formation. In applications of formation gravity measurements, it is only the gravity gradient that is of interest since the gradient is related to the bulk density of the formation between the measurement stations according to well-known formulas. From this bulk density, estimates can be obtained of porosity and fluid saturation in the porous rocks of the formation. This gravity gradient has been determined by measuring the gravity difference of any two points along the formation and then dividing by the vertical distance separating the two points.

Current gravity technology measures gravity at discrete points along a formation by detecting motion of a small test mass in a gravity logging tool as the tool remains stationary. Small changes in gravitational acceleration cause this mass to move against the restoring force of a spring. Various approaches to the detection of this minute movement are possible. One such method is illustrated in detail in U.S. Pat. No. 4,399,693, to L. S. Gournay. The general arrangement of a gravimetric exploration operation as well as a conventional LaCoste and Romberg-type gravity meter of the mass-spring combination is shown in such Gournay patent. Also in the Gournay patent is the standard formula for computing formation bulk density from the gravity difference measurements. These gravity difference measurements must be made when the tool is motionless with respect to the formation. Such tool is not practical for making continuous measurements since there is no accurate means for eliminating the force on the test mass due to tool acceleration, and consequently, accurate gravity readings cannot be made with the tool in motion. This limitation requires that the gravity tool be stopped for a period of several minutes at each point or station along the formation at which a gravity difference measurement is desired. Another limitation is that the vertical resolution of the tool is only about ten feet.

It is, therefore, an object of the present invention to provide a method and system for the continuous gravity logging which directly measures the variation of gravity gradient along a formation rather than gravity difference and which is insensitive to the effects of accelerations due to unsteady motions of the gravity logging tool.

SUMMARY OF THE INVENTION

The present invention is directed to a method and system for conducting a gravimetry survey of earth formations. The formation is continuously traversed with a gravity logging tool having a column of fluid within the tool. A first pressure difference is measured along a first interval within the column of fluid. A second pressure difference is measured along a second interval within the column of fluid. These first and second pressure difference measurements are differenced to determine the gravity gradient between such first and second intervals.

The first interval over which the first pressure difference is measured lies within an upper portion of the logging tool and the second interval over which the second pressure difference is measured lies within a lower portion of the logging tool. In one aspect of the invention, the first and second intervals are spaced apart, while in another aspect of the invention, the first and second intervals overlap at least along a portion of the fluid column.

In a more specific aspect of the invention, the logging tool includes a container for the fluid column which maintains a constant pressure along the length of the column. Temperature is maintained constant along the column by an external heat absorber or by a heat absorbing element located with the column itself. Baffles are located within the fluid column to prevent thermally driven convection. A sound absorber is also located within the fluid column to inhibit the transmission of acoustic waves. The fluid column is further shock-mounted to prevent acoustic waves from being excited within the column itself.

DESCRIPTION OF THE PREFERRED EMBODIMENT

In accordance with the present invention, there is provided a method and system for gravity gradient logging in which the gravity gradient is measured directly by differencing the outputs of spaced apart sensors which respond to total acceleration. The sensors are separated by a fixed and known distance. Each sensor responds to acceleration due to both the gravitational field and tool movement. The sensors experience the same tool acceleration provided their responses are equal when the vertical distance between them is zero and there is no relative motion between them when the gravity measurements are made. Therefore, the difference in sensor outputs will cancel the effects of tool acceleration and yield an output dependent only on the gravity gradient for the vertical separation between the sensors.

Figure 1:
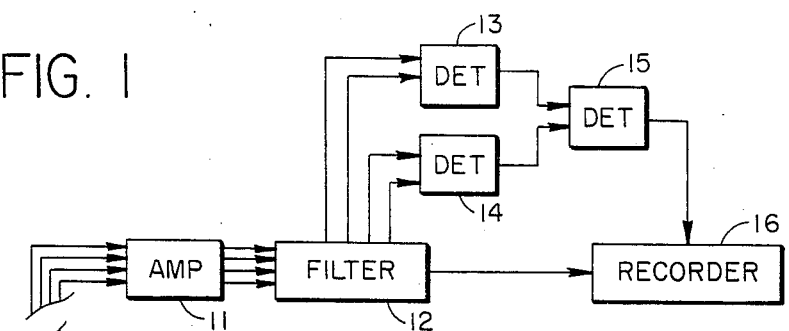
FIG. 1 illustrates a gravity logging system with which the gravity gradient measurement of the present invention may be utilized.

Referring now to FIG. 1, gravity gradient measurements are made by continuously moving the tool 10 along the formation of interest. The gravimetric measurements are applied to an amplifier 11, a filter 12, difference detectors 13–15, and a recorder 16 to produce a log of gravity gradient measurements as a function of tool location. The earth formation to be logged may be the surface of the earth wherein the tool 10 and system components 11–16 traverse such surface while mounted in a moving vehicle, such as an airplane, helicopter, boat, truck, trailer, or the like. Or, the earth formation may be a subsurface formation penetrated by a borehole wherein the tool 10 is advanced through the borehole by means of a logging cable. For a surface gravity survey, the gravity measurements are coordinated with the geographic position of the moving vehicle, while for a subsurface gravity survey the gravity measurements are coordinated with the depth of the tool in the borehole.

The gravity gradient measurements of logging tool 10 are accomplished by the measurement of changes in the pressure exerted by a column of fluid contained within the logging tool as the tool traverses the formation of interest. The basic principle involved is that the pressure in a fluid column is given by: $p=(g)(\rho)(h)$, where p is the pressure, g is the gravitational acceleration at the measuring point, $\rho$ is the fluid density and h is the height of the column of fluid above the measuring point measured along the gravity vector, g. If $\rho$ and h are held constant, then $p=(g)(c)$, where c is a constant. Changes in gravity are due to changes in the radial distance from the center of the earth and to a locally varying component due to changes in density of the adjacent earth formations. Changes in gravity due to changes in the radial distance from the center of the earth are due to the so-called free-air effect and are predictable. Therefore, a measure of formation density can be extracted from such measurements since the free-air effect is known. Since the quantity related to formation density is small, it is advantageous to measure the difference in pressure between two vertically spaced points within the tool to increase the sensitivity of the measurements.

In continuous gravity logging, unavoidable unsteady motions of the logging tool produce accelerations which may be larger than the gravity. Removal of such spurious accelations from the measurements is accomplished in the present invention by making at least two pressure difference measurements $\Delta p$ at spaced points within the tool and combining these measurements such that the effects of accelerations due to unsteady tool motion are eliminated.

Figure 2:
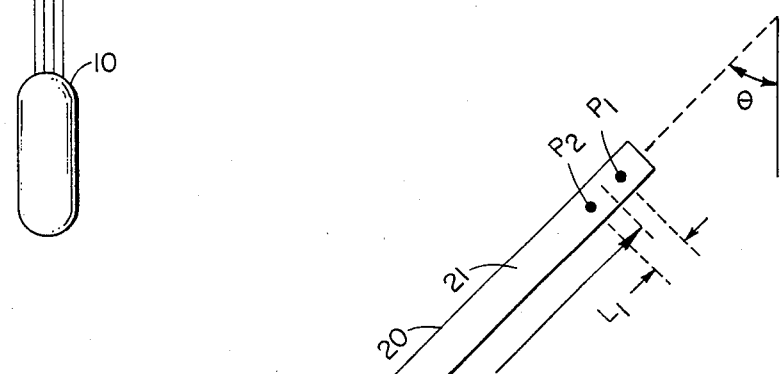
FIG. 2 illustrates a fluid column within the logging tool of FIG. 1 containing the pressure sensors $P_1$ through $P_4$ utilized in measuring gravity gradient.
Figure 3:
FIG. 3 is a free body force diagram of the upper portion of the fluid column of FIG. 2 containing pressure sensors $P_1$ and $P_2$.

This may be more readily understood by the following discussion taken in conjunction with FIG. 2. A first pressure difference measurement $\Delta P_{12}$ is made between first spaced-apart axial positions $P_1$ and $P_2$ along the interval $L_1$ in the upper portion of the fluid column 21 contained by the cylinder 20. This pressure difference $\Delta P_{12}$ is determined by means of the difference detector 13 of FIG. 1. At least a second pressure difference measurement $\Delta P_{34}$ is made between second spaced-apart axial positions $P_3$ and $P_4$ along the interval $L_2$ in the lower portion of the fluid column. This pressure difference $\Delta P_{34}$ is determined by means of the difference detector 14 of FIG. 1. The center point between the first pair of positions $P_1$ and $P_2$ is separated from the center point between the second pair of positions $P_3$ and $P_4$ by the distance indicated as h. The points labeled by the various P terms are pressure sensor locations in the fluid column. If the distances $L_1$ and $L_2$ are sufficiently small so that the gravitational acceleration can be assumed constant over the interval, then the pressure differences denoted and defined by $$\Delta P_{12} = P_2 - P_1, \quad (1)$$

$$\Delta P_{34} = P_4 - P_3, \quad (2)$$

are functions of the fluid density, the local and assumed constant gravitational acceleration in each interval, the acceleration due to tool motion, and the vertical distance separating the pressure sensors where vertical is taken to mean radially toward the center of the earth. An isolated element of this fluid column containing the upper interval $L_1$ is depicted in FIG. 3 which shows the body forces and accelerations. The element is assumed to be a uniform cylinder of cross-sectional area A inclined at the angle $\theta$ from a radial direction to the center of the earth. The fluid density $\rho_{12}$ is the average density of the fluid over the interval, $g_1$ is the gravitational acceleration assumed constant over the small interval $L_1$, and a is the acceleration of the element assumed directed along the cylinder axis 22.

Summing the forces along the cylinder axis results in $$P_2 A - P_1 A - mg_1 \cos\theta + ma = 0$$

$$A(P_2 - P_1) = mg_1 \cos\theta - ma \quad (3)$$
$$= \rho_{12} A L g_1 \cos\theta - \rho_{12} A L a,$$

or $$\Delta P_{12} = \rho_{12} L (g_1 \cos\theta - a) \quad (4)$$

Carrying out the same operations for a similar differential element in the lower interval $L_2$ yields the equation $$\Delta P_{34} = \rho_{34} L (g_2 \cos\theta - a) \quad (5)$$

where $\rho_{34}$ is the average fluid density over the lower interval and $g_2$ is the average gravitation aceleration.

Differencing the equations (4) and (5) yields $$\Delta P_{34} - \Delta P_{12} = \rho_{34} L g_2 \cos\theta - \rho_{12} L g_1 \cos\theta - \rho_{34} L a + \rho_{12} L a \quad (6)$$

Inspection of equation (6) reveals that if the fluid column is maintained such that the fluid density is a constant value then with $$\rho = \rho_{12} = \rho_{34} \quad (7)$$

substituted into equation (6) the difference in differential pressures becomes $$\Delta P_{34} - \Delta P_{12} = \rho L g_2 \cos\theta - \rho L g_1 \cos\theta \quad (8)$$
$$= \rho L \cos\theta (g_2 - g_1),$$

from which $$\Delta g = g_2 - g_1 = \frac{\Delta P_{34} - \Delta P_{12}}{\rho L \cos\theta}. \quad (9)$$

Note that the constant fluid density results in the cancellation of terms related to the tool acceleration a. Therefore, measurements of the gravitational gradient are obtainable from a moving tool and the equation for the gradient is:

$$\frac{\Delta g}{h\cos\theta} = \frac{\Delta P_{34} - \Delta P_{12}}{\rho h L \cos^2\theta} \quad (10)$$

This gradient is determined by the difference detector 15 of FIG. 1 from the differences in pressures $\Delta P_{12}$ and $\Delta P_{34}$ with accurate numerical evaluation requiring an accurate knowledge of the pressure differences, the angle of inclination $\theta$ of the fluid column from the vertical, and the distances h and $L_1$ and $L_2$ which are known.

The analysis presented above leading to equation (10) based on elementary priniciplesis correct, but a more detailed analysis beginning with the differential equation relating the pressure gradient to fluid density and accelerations leads to stronger results by relaxing the assumption of constant gravitational acceleration over the short intervals and leads to an alternate design for the intervals over which the pressure differential measurements are taken.

This equation given by $$\frac{dP}{dl} = \rho g \cos\theta - \rho a \tag{11}$$

is a limiting case of either equations (4) or (5), and has the correct sign for a coordinate system in which the l axis passes through the center of the assumed cylindrical fluid column and is positive down.

Integration of equation (11) over any Interval $[l_a, l_b]$ yields $$\int_{l_a}^{l_b} \frac{dP}{dl} = P(l_b) - P(l_a) = P_b - P_a = \Delta P_{ab} \tag{12}$$

and in particular, $$\int_{l_1}^{l_2} \frac{dP}{dl} dl = P_2 - P_1 = \Delta P_{12} = \rho \cos\theta \int_{l_1}^{l_2} g\, dl - \rho La \tag{13}$$

By the first mean value theorem, there exists some $l_{12}$ in $[l_1, l_2]$ such that:

$$\Delta P_{12} = (l_2 - l_1)\rho\cos\theta g(l_{12}) - \rho La \tag{14}$$
$$= L\rho\cos\theta g(l_{12}) - \rho La.$$

Furthermore, if g is a linear function of l, then $$\Delta P_{12} = L\rho \cos\theta g_1 - \rho La, \tag{15}$$

where $g_1$ is the value of g at the midpoint between $l_1$ and $l_2$ and similar results hold for the lower interval for which $$\Delta P_{34} = L\rho \cos\theta g_2 - \rho La, \tag{16}$$

where $g_2$ is the value of g midway between $l_3$ and $l_4$.

The above simple extension of the earlier analysis eliminates the constant g assumption leading to equations (4) and (5). The alternate design can be derived by application of equation (12) as follows:

$$\int_{l_1}^{l_3} - \int_{l_2}^{l_4} = \int_{l_1}^{l_2} + \int_{l_2}^{l_3} - \tag{17}$$

$$\int_{l_2}^{l_3} - \int_{l_3}^{l_4} = \int_{l_1}^{l_2} - \int_{l_3}^{l_4}$$

where the integrands in each of the above terms is in the left hand side of equation (12). Now using the right hand side of equation (12) the results of equation (17) become $$\Delta P_{13} - \Delta P_{24} = \Delta P_{12} - \Delta P_{34}, \tag{18}$$

and from equation (9)

$$\Delta g = \frac{\Delta P_{24} - \Delta P_{13}}{\rho L \cos\theta} \tag{19}$$

Physically, the meaning of equation (19) is that the pressure measurements can be made over the long intervals associated with $P_2$ and $P_4$ and with $P_1$ and $P_3$ of FIG. 2 and the same theoretical results are obtained as taking the pressure measurements over the shorter intervals associated with $P_1$ and $P_2$ and with $P_3$ and $P_4$.

The conclusion of the above analysis is that the two pressure measurements required for the determination of $\Delta g$ can be obtained using two distinctly different approaches, the first leading to equation (9) over short intervals, and the second leading to equation (19) over much longer intervals.

Appreciation of the distinction between the two cases makes possible two different designs with the favored choice being the one which physically produces the most accurate measurements. It is, of course, possible to envision a system designed to produce all four pressure measurements so that both equations (9) and (19) can be applied to produce two estimates of $\Delta g$ that could then be averaged.

A system for carrying out the foregoing described invention may employ any type of pressure sensors which have sufficient sensitivity to detect the difference in pressure at two spaced points within a column of fluid caused by changes in density of the rock formations adjacent to the borehole. A suitable pressure sensor is a piezoelectric crystal controlled high frequency oscillator of the type used in commercial pressure gauges, such as the quartz crystal pressure gauge manufactured by the Hewlett-Packard Company. In this pressure gauge, a measuring crystal whose resonant frequency is responsive to pressure is exposed to pressure in the fluid and a similar crystal not exposed to the fluid pressure are both excited and their resonance frequencies compared. The difference in these frequencies is a measure of the pressure difference between the two crystals. In the present invention, no reference crystal is used; the resonant frequencies of a pair of spaced apart crystals exposed to the pressure exerted by a column of fluid is compared and the pressure difference between the crystal locations is derived therefrom. Other suitable pressure sensors may also be used such as those manufactured by ParoScientific Company.

One choice of an embodient included the coupling of a ParoScientific 5006-D $\Delta$P Transducer with a Hewlett-Packard HP-5370B Time Interval Counter for providing the desired frequency resolution. Each Time Interval Counter is coupled to a Hewlett-Packard HP85 minicomputer which determines the pressure difference between the pressure transducer locations.

Any fluid may, in principle, be used. However, to provide high sensitivity and relative freedom from environmental effects, the fluid should be a liquid with high density, low vapor pressure at the temperature of operation, high thermal conductivity, a small coefficient of thermal expansion and low bulk compressibility. Mercury and gallium (above its melting point) are two such liquids.

Preferably, the distances of intervals $L_1$ and $L_2$ should be at least 20 cm., while the distance h between the midpoints of such intervals should be at least 9 ft. One choice of an embodiment for such a system included a fluid column of mercury with a density $\rho$ of about 13.5 g/cc., lengths $L_1$ and $L_2$ of about 30 cm., and distance h of about 15 feet. This embodiment is within the range of conventional quartz crystal pressure transducer technology.

Figure 4:
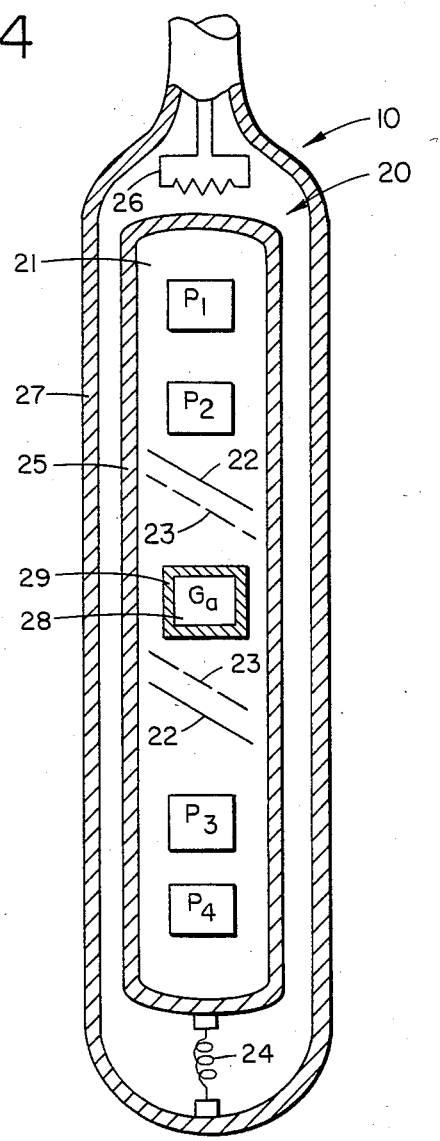
FIG. 4 is a more detailed illustration, partially in cross-section, of the borehole logging tool with its fluid column of FIGS. 1 and 2.

Referring now to FIG. 4, the cylinder 20 may be a simple tube which is preferably closed and completely filled with the liquid 21. It is necessary and sufficient that the liquid be in pressure communication throughout its effective length. Baffles 22 may be present within the column to prevent thermally driven convection; sound absorbers 23 and/or baffles may be present in the column to absorb or destructively interfere with (muffle) acoustic waves which may be transmitted to the column. The column may also be shock-mounted, as shown at 24, in the tool to prevent acoustic waves from being excited in the liquid.

The density of the liquid in the column must be known in order to extract the value of gravity or gravity difference from the measured pressures. It is highly convenient to maintain a relatively constant pressure and temperature in the fluid; however, corrections for the effects of small changes in these factors are easily made, if necessary.

Pressure within the column can be maintained reasonably constant by mounting it in a pressure case 25 such as commonly used in logging tools. Temperature can be maintained reasonably constant by heating the column, as shown at 26, to a temperature greater than the expected maximum borehole temperature. Even better temperature control can be achieved by thermally insulating the column. This may be achieved by mounting it inside a vacuum flask 27. Still further temperature control can be achieved by including a heat absorber external to or within the column, or both. A very effective heat absorbing material is solid gallium 28 which melts at about 87° F. In a mercury column this would be a very convenient operating temperature. If contained within the column, the gallium would have to be placed in a sealed container 29, preferably a metal with good heat conductivity and inert in the presence of mercury, such as stainless steel.

While a preferred embodiment of the invention has been described and illustrated, numerous modifications or alterations may be made without departing from the spirit and scope of the invention as set forth in the appended claims.

We claim:

1. A method for conducting a gravimetry survey of an earth formation, comprising the steps of:
(a) continuously traversing said earth formation with a gravity logging tool having a column of fluid within said tool,
(b) measuring a first pressure difference along a first interval within said column of fluid,
(c) measuring a second pressure difference along a second interval within said column of fluid,
(d) differencing said first and second pressure differences to determine the gravity gradient along said earth formation between said first and second intervals.

2. The method of claim 1 wherein said first pressure difference is measured along said first interval in an upper portion of said fluid column and said second pressure differential is measured along said second interval in a lower portion of said fluid column.

3. The method of claim 2 wherein said first and second intervals are spaced-apart along the fluid column.

4. The method of claim 3 wherein the differencing of said first and second pressure difference measurements to determine gravity gradient is carried out in accordance with the following expression:

$$\Delta g = \frac{\Delta P_{34} - \Delta P_{12}}{\rho L \cos\theta}$$

where
$\Delta g$ = gravity gradient,
$\Delta P_{12}$ = first pressure difference measured along said first interval in said upper portion of the fluid column,
$\Delta P_{34}$ = second pressure difference measured along said second interval in said lower portion of the fluid column,
$\rho$ = density of the fluid column,
L = length of both said first and second intervals within said fluid column, and
$\theta$ = angle of inclination of the fluid column from the vertical.

5. The method of claim 2 wherein said first and second intervals overlap along at least a portion of the fluid column.

6. The method of claim 5 wherein the differencing of said first and second pressure difference measurements to determine gravity gradient is carried out in accordance with the following expression:

$$\Delta g = \frac{\Delta P_{24} - \Delta P_{13}}{\rho L \cos\theta},$$

where
$\Delta g$ = gravity gradient,
$\Delta P_{13}$ = first pressure difference measured along said first interval within said upper portion of the fluid column,
$\Delta P_{24}$ = second pressure difference measured along said second interval within said lower portion of the fluid column,
$\rho$ = density of the fluid column,
L = length of both said upper and lower portions of the fluid column, and
$\theta$ = angle of inclination of the fluid column from the vertical.

7. Apparatus for conducting a gravimetry survey of earth formations, comprising:
(a) a gravity logging tool,
(b) a fluid column within said logging tool,
(c) first and second pressure sensors located at spaced-apart axial positions within an upper portion of said fluid column,
(d) third and fourth pressure sensors located at spaced-apart axial positions within a lower portion of said fluid column,
(e) means for differencing the outputs of a first pair of said pressure sensors, to produce a first pressure difference measurement over a first interval within said fluid column,
(f) means for differencing the outputs of a second pair of said pressure sensors to produce a second pressure difference measurement over a second interval within said fluid column, and
(g) means for differencing said first and second pressure difference measurements to produce an output representative of a continuously moving gravity gradient along said earth formation between said first and second intervals which is insensitive to acceleration effects from unsteady motions of the logging tool during a gravimetry survey.

8. The system of claim 7 wherein said first and second intervals are spaced-apart along the fluid column.

9. The system of claim 7 wherein said first and second intervals overlap along at least a portion of the fluid column.

10. The system of claim 7 wherein said first and second pressure sensors are spaced-apart a distance of at least 20 centimeters along a fluid column of mercury and said third and fourth sensors are spaced-apart a distance of at least 20 centimeters along the fluid column.

11. The system of claim 7 wherein the distance from the midpoints between said first and second pressure sensors and said third and fourth pressure sensors is at least 9 feet along the fluid column.

12. The system of claim 7 wherein said fluid column comprises mercury.

13. The system of claim 7 wherein said fluid column comprises gallium.

14. The system of claim 7 wherein said pressure sensors are quartz crystal pressure transducers.

15. The system of claim 14 wherein said tranducers are crystal controlled high frequency oscillators.

16. The system of claim 7 further including baffles within said fluid column to prevent thermally driven convection along said fluid column.

17. The system of claim 7 further including sound absorbing means within said fluid column for inhibiting the transmission of acoustic waves along said fluid column.

18. The system of claim 7 wherein said fluid column is shock-mounted within said tool to prevent acoustic waves from being excited within the fluid column.

19. The system of claim 7 wherein said fluid column is located within a pressure casing.

20. The system of claim 7 further including means for heating the fluid column to a temperature greater than the maximum borehole temperature.

21. The system of claim 7 wherein said fluid column is thermally insulated.

22. The system of claim 7 further including heat absorbing means associated with said fluid column.

23. The system of claim 22 wherein said heat absorbing means is located within said fluid column.

24. The system of claim 22 wherein said heat absorbing means surrounds said fluid column.

25. The system of claim 22 wherein said heat absorbing means comprises gallium.

26. The system of claim 25 wherein said gallium is placed in a sealed container for enhancing heat conductivity between said fluid column and said gallium.

27. The system of claim 26 wherein said fluid column comprises mercury and said sealed container is inert in the presence of said mercury.

28. The system of claim 27 wherein said sealed container comprises stainless steel.

* * * * *